(12) United States Patent
Kosyakov

(10) Patent No.: US 10,957,914 B2
(45) Date of Patent: Mar. 23, 2021

(54) METAKOALIN SOLID IONIC CONDUCTOR AND A SODIUM-LON BATTERY USING THE SAME

(71) Applicant: Natrion LLC, Albany, NY (US)

(72) Inventor: Alexander Sergeevich Kosyakov, Greenwich, CT (US)

(73) Assignee: Natrion LLC, Albany, NY (US)

( * ) Notice: Subject to any disclaimer, the term of this patent is extended or adjusted under 35 U.S.C. 154(b) by 47 days.

(21) Appl. No.: 16/378,111

(22) Filed: Apr. 8, 2019

(65) Prior Publication Data

US 2019/0319275 A1    Oct. 17, 2019

Related U.S. Application Data

(60) Provisional application No. 62/657,679, filed on Apr. 13, 2018.

(51) Int. Cl.
*H01M 4/00* (2006.01)
*H01M 4/90* (2006.01)
*H01M 10/39* (2006.01)
*H01M 4/38* (2006.01)
*H01M 4/02* (2006.01)

(52) U.S. Cl.
CPC ........... *H01M 4/9016* (2013.01); *H01M 4/38* (2013.01); *H01M 10/3945* (2013.01); *H01M 2004/027* (2013.01); *H01M 2004/028* (2013.01)

(58) Field of Classification Search
CPC .. H01M 4/1391; H01M 4/131; H01M 4/0404; H01M 2004/028; H01M 4/523; H01M 4/661; Y02E 60/50
See application file for complete search history.

(56) References Cited

U.S. PATENT DOCUMENTS

2017/0110259 A1*   4/2017   Mitlin .................... H01G 11/36

* cited by examiner

*Primary Examiner* — Cynthia H Kelly
*Assistant Examiner* — Monique M Wills
(74) *Attorney, Agent, or Firm* — Whitmyer IP Group LLC

(57) ABSTRACT

A sodium-ion battery comprising a biochar-based anode layer, an $NaNiO_2$ cathode layer, and an metakaolin solid electrolyte pellets layer.

8 Claims, 7 Drawing Sheets

METAKAOLIN SOLID IONIC CONDUCTOR AND A SODIUM-ION BATTERY USING THE SAME

CROSS REFERENCE TO RELATED APPLICATIONS

This patent application claims the benefit, under 35 U.S.C. § 119(e), of U.S. Provisional Patent Application Ser. No. 62/657,679, filed on Apr. 13, 2018, the content of which is incorporated herein by reference in its entirety.

TECHNICAL FIELD

The present teaching relates generally to sodium-ion batteries. More specifically, the present teaching relates to sodium-ion batteries produced using a biochar-based anode, $NaNiO_2$ cathode, and a new metakaolin solid electrolyte derived from the calcination of kaolinite, proved to be cost-effective and a safe alternative to current battery technologies in the realm of energy storage systems.

BACKGROUND

The challenges of fossil fuel-driven climate change and increasing global energy demands have given rise to renewable energy power grids. However, the intermittent energy production associated with wind and solar power generation techniques means that modern grids now require intermediate energy storage systems (ESSs) consisting of large batteries. This necessity for grid-scale energy storage has become so great that it is projected to be an industry worth at least $250 billion worldwide by 2040.

Lithium-ion batteries (LIBs) have been a technological mainstay for the last two decades, but many issues are associated with their use in ESSs. ESS applications prioritize safety, cost-effectiveness, and longevity. LIBs do not meet these criteria; though possessing great energy density, LIBs employ volatile liquid electrolytes (LEs) that can combust in the presence of air or lead to thermal runaway. In addition, the world supply of mineable lithium is rapidly being depleted and is even projected to be exhausted within 65 years, making LIBs even more expensive.

Sodium is 2000 times as abundant and 37 times as cheap as lithium and can be used in sodium-ion batteries (SIBs) analogous to LIBs. SIBs, however, are made with similar LEs and are thus plagued with the same safety issues as LIBs. They also suffer from performance deficiencies in such areas as capacity and overall energy density, which limits their ability to replace LIBs in areas like ESSs.

Through intrinsically safe and cost-effective aqueous electrolytes are a viable alternative to aprotic organic electrolytes in SIBs, batteries employing them tend to suffer in performance and are not long-lasting due to electrode degradation. Therefore, a superior alternative would be the implementation of solid electrolytes (SEs) in SIBs. SEs are characterized with greater thermal stability than LEs and also eliminate the risk of electrolyte leaks—a danger that could prove catastrophic in grid-scale batteries. In addition, SEs facilitate the incorporation of sodium metal anodes into SIB systems. Metallic Na anodes possess unparalleled capacity but are prone to dendritic growth that can short-circuit liquid electrolyte batteries.

However, the most prominent SEs in literature—B-alumina and sodium superionic conductor (NASICON)—are greatly limited in their performance and industrial scalability. For instance, B-alumina needs to be heated to high temperatures to conduct sodium ions, which complicates operation at room temperature and in some battery systems can lead to explosion. In general, very few SEs have high Na+ conductivity at room temperature, with the exception of NASICON. NASICON, however, requires multiple high temperature firings to refine its crystal grain for effective charge conduction, as well as sintering to the electrodes with which it is used. The problematic surface grain of NASICON also renders it incompatible with most conventional cathode materials. Consequently, current SIB architectures utilizing NASICON are difficult to mass-produce and are not cost-effective.

Therefore, it would be beneficial to have a cost-effective sodium-ion battery that can be mass produced and which can be incorporated into the ESSs of smart power grids relying on renewable energy and a solid electrolyte.

SUMMARY

The needs set forth herein as well as further and other needs and advantages are addressed by the present embodiments, which illustrate solutions and advantages described below.

The sodium-ion battery of one embodiment, according to the present teaching, includes, but is not limited to, a biochar-based anode layer, an $NaNiO_2$ cathode layer, and a metakaolin solid electrolyte pellets layer.

In a further embodiment, the biochar-based anode comprises biochar pelletized with a steel die.

In a further embodiment, the $NaNiO_2$ cathode comprises a mixture of polyvinylidene difluoride, carbon black, and sodium nickel dioxide combined with deionized water to form a slurry.

In a further embodiment, the $NaNiO_2$ cathode is formed by laying the slurry onto an aluminum plate.

In a further embodiment, the metakaolin solid electrolyte pellets are derived from a calcination of kaolinite.

In a further embodiment, the biochar-based anode, $NaNiO_2$ cathode, and the metakaolin solid electrolyte pellets are layered on an aluminum current collector. The biochar-based anode is layered first, then the metakaolin solid electrolyte pellets are layered, then the $NaNiO_2$ cathode is layered.

In a further embodiment, the aluminum current collector is placed on a spacer plate and into a positive bottom of a coin cell, a second spacer plate is placed on the NaNiO2 cathode, a spring is placed on the second spacer plate, and a negative lid of the coin cell is placed on top of the spring to close the coin cell.

In a further embodiment, the sodium-ion battery is used in a power grid as an energy storage source. According to further embodiments, the sodium-ion battery can also be used in, but is not limited to, electronics, vehicles, and other battery-operated equipment, as an energy storage source.

In a further embodiment, a power grid includes an energy storage source having a plurality of the sodium-ion battery.

One method for assembling a sodium-ion battery of another embodiment, according to the present teaching, includes, but is not limited to layering a biochar-based anode, an $NaNiO_2$ cathode, and a metakaolin electrolyte pellet on an aluminum current collector.

In a further embodiment, the biochar-based anode is formed by pelletizing biochar with a steel die to form biochar pellets.

In a further embodiment, the $NaNiO_2$ cathode is formed by combining polyvinylidene difluoride, carbon black, and sodium nickel dioxide mixed with deionized water to form a slurry and layering the slurry onto an aluminum plate and drying the slurry.

In a further embodiment, the metakaolin electrolyte pellets are formed by compressing kaolinite powder into pellets and heating the pellets.

In a further embodiment, the biochar-based anode is layered first, then the metakaolin solid electrolyte pellets are layered, then the $NaNiO_2$ cathode is layered.

In a further embodiment, the aluminum current collector is placed on a spacer plate and into a positive bottom of a coin cell, a second spacer plate is placed on the NaNiO2 cathode, a spring is placed on the second spacer plate, and a negative lid of the coin cell is placed on top of the spring to close the coin cell.

In a further embodiment, the sodium-ion battery is used in a power grid as an energy storage source. According to further embodiments, the sodium-ion battery can also be used in, but is not limited to, electronics, vehicles, and other battery-operated equipment, as an energy storage source.

In a further embodiment, a power grid includes an energy storage source having a plurality of the sodium-ion battery.

Another method for assembling a sodium-ion battery of another embodiment, according to the present teaching, includes, but is not limited to, layering a biochar-based anode, an $NaNiO_2$ cathode, and a metakaolin electrolyte pellet on an aluminum current collector. The biochar-based anode is formed by pelletizing biochar with a steel die to form biochar pellets. The $NaNiO_2$ cathode is formed by combining polyvinylidene difluoride, carbon black, and sodium nickel dioxide mixed with deionized water to form a slurry and laying the slurry onto an aluminum plate and drying said slurry. The metakaolin electrolyte pellets are formed by compressing kaolinite powder into pellets and heating said pellets. The biochar-based anode is layered first, then the metakaolin solid electrolyte pellets are layered, then the $NaNiO_2$ cathode is layered. The aluminum current collector is placed on a spacer plate and into a positive bottom of a coin cell, a second spacer plate is placed on the NaNiO2 cathode, a spring is placed on the second spacer plate, and a negative lid of the coin cell is placed on top of the spring to close the coin cell.

Other embodiments of the system and method are described in detail below and are part of the present teachings.

For a better understanding of the present embodiments, together with other and further aspects thereof, reference is made accompanying drawings and detailed description, and its scope will be pointed out in the appended claims.

DETAILED DESCRIPTION

Figure 1:
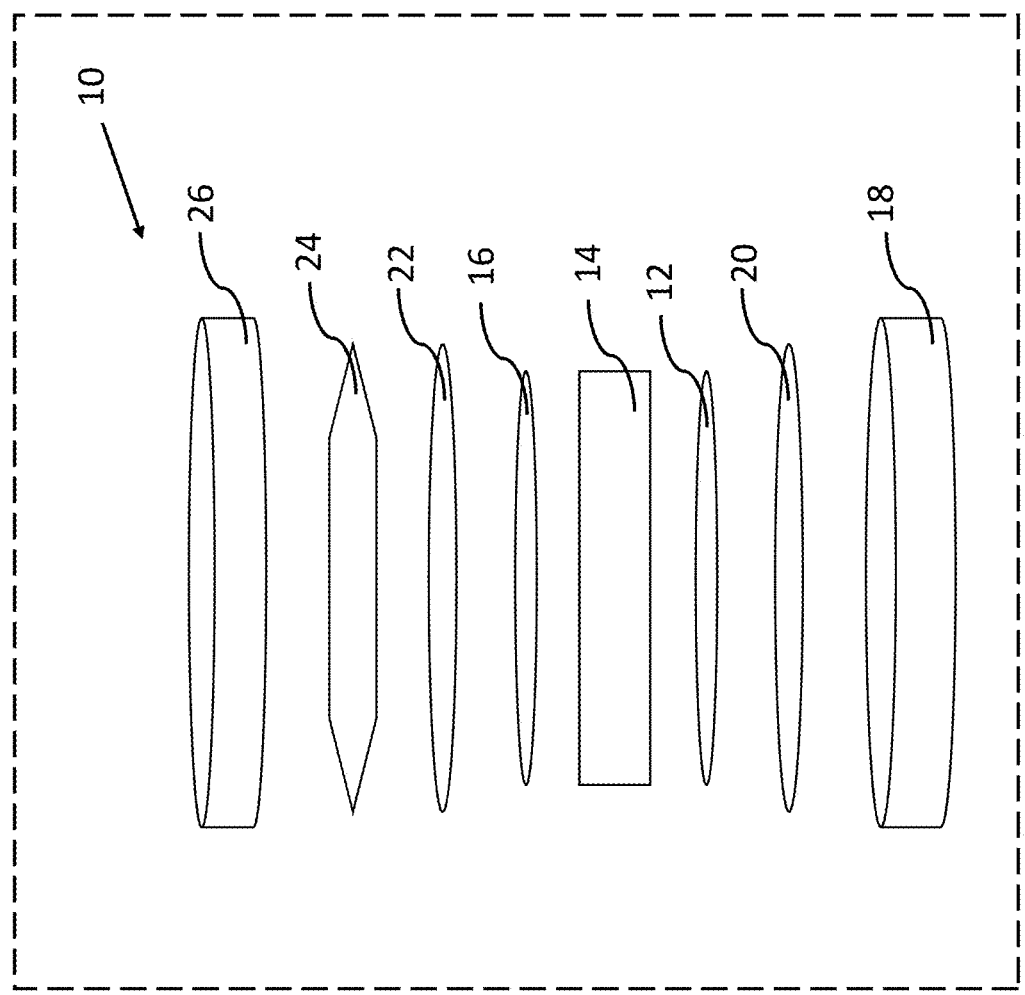
FIG. 1 is an exploded perspective view of an electrochemical cell.

The present teachings are described more fully hereinafter with reference to the accompanying drawings, in which the present embodiments are shown. The following description is presented for illustrative purposes only and the present teachings should not be limited to these embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, composition, apparatus, component, means, step, etc., are to be interpreted openly as referring to at least one instance of the element, composition, apparatus, component, means, step, etc., unless explicitly stated otherwise. The steps of any method disclosed herein do not have to be performed in the exact order disclosed, unless explicitly stated. The use of "first," "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, Applicant does not intend any of the appended claims or claim elements to invoke 35 U.S.C. 112(f) unless the words "means for" or "step for" are explicitly used in the particular claim.

The sodium-ion battery, according to one embodiment, includes an anode, a cathode, and an electrolyte. The cathode was prepared with a polyvinylidene difluoride (PVdF), carbon black, and $NaNiO_2$ powder mixture using the process described in De Silva et al., "Sodium nickel oxide nanoporous cathodes used for sodium-ion rechargeable batteries,"

vol. 15, pp. 19-29, 2014. A slurry was obtained by adding the powder mixture to di-$H_2O$. The slurry was then layered onto a circular aluminum (Al) plate 15 mm in diameter and allowed to dry to produce a standard NIB $NaNiO_2$ cathode. The anode was prepared by substituting biochar for the hard carbon in the procedure found in Kim et al., "Na ion-Conducting Ceramic as Solid Electrolyte for Recharging Seawater Batteries," *Electrochim. Acta*, vol. 191, pp. 1-7, 2016. The resultant mixture was then pelletized with a steel die as done in the manufacturing of solid electrolyte (SE) pellets. The electrolyte was prepared first with the production of metakaolin SE (MSE) pellets. The pellets were produced with a one step calcination process. This resulted in the dehydroxylization of the kaolinite and the formation of a dense ceramic:

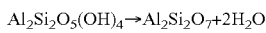

$$Al_2Si_2O_5(OH)_4 \rightarrow Al_2Si_2O_7 + 2H_2O$$

The kaolinite powder was placed into a 13 mm steel evacuable die and compressed into a vice to form a 1 mm thick pellet. The pellet was then heated in a furnace at ~1000° C. for ~4 hours.

Referring now to FIG. 1, the figure shows, by way of a non-limiting example, an exploded perspective view of the electrochemical CR2032 full coin cell. A case lid (26) and a case bottom (18) contain the cell and serve as the positive and negative terminals respectively. Placed inside the negative case bottom (18) is a spacer plate (20), followed by the biochar-based anode covered aluminum current collector (12), the metakaolin solid electrolyte pellets (14), and the $NaNiO_2$ cathode (16). To complete the cell (10) a second spacer plate (22) is placed on top of the cathode (16), followed by a spring (24) and topped off with the positive case lid (26).

According to one embodiment the coin cell case lid (26) can be at least a stainless steel lid.

According to one embodiment the coin cell case bottom (18) can be at least a special oxidation resistant case bottom.

According to one embodiment the coin cell case lid (26) can be negative and the coin cell case bottom (18) can be positive.

CR2032 full cell batteries were assembled and sealed in an $N_2$ atmosphere by layering the synthesized carbonaceous anodes, MSE pellets, and $NaNiO_2$ cathodes atop 16 mm-diameter circular Al current collectors within CR2032 coin cell casings, as shown in FIG. 1.

According to one embodiment, the CR2032 batteries can also be assembled and sealed in any other inert atmosphere, including argon.

Figure 2:
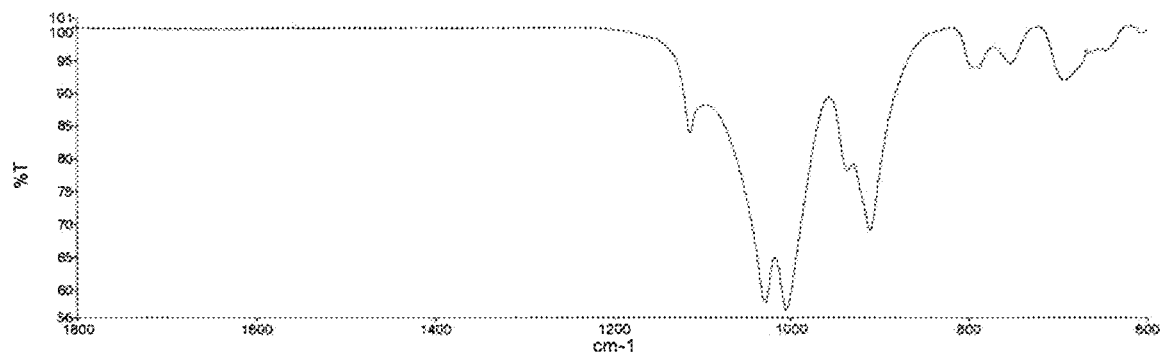
FIG. 2 is an attenuated total reflection-Fourier-transform infrared spectroscopy (ATR-FTIR) spectra for kaolinite ($Al_2Si_2O_5(OH)_4$).

Referring now to FIG. 2, the figure shows an attenuated total reflectance Fourier transform infrared (ATR-FTIR) spectra for kaolinite.

Figure 3:
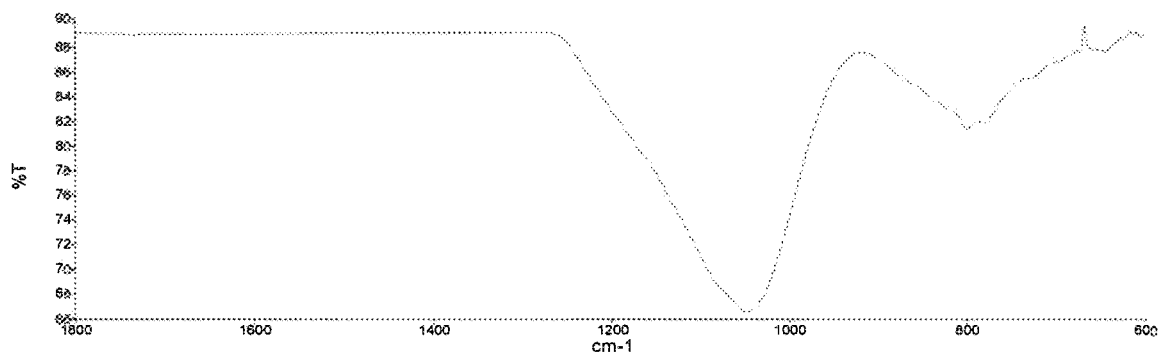
FIG. 3 is an ATR-FTIR spectra for metakaolin ($Al_2Si_2O_7$).

Referring now to FIG. 3, the figure shows an attenuated total reflectance Fourier transform infrared (ATR-FTIR) spectra for metakaolin.

The comparisons of FIG. 2 and FIG. 3 show the disappearance of Al—OH vibrations as well as Al—O—Si vibrations from the kaolinite due to calcination.

Figure 4:
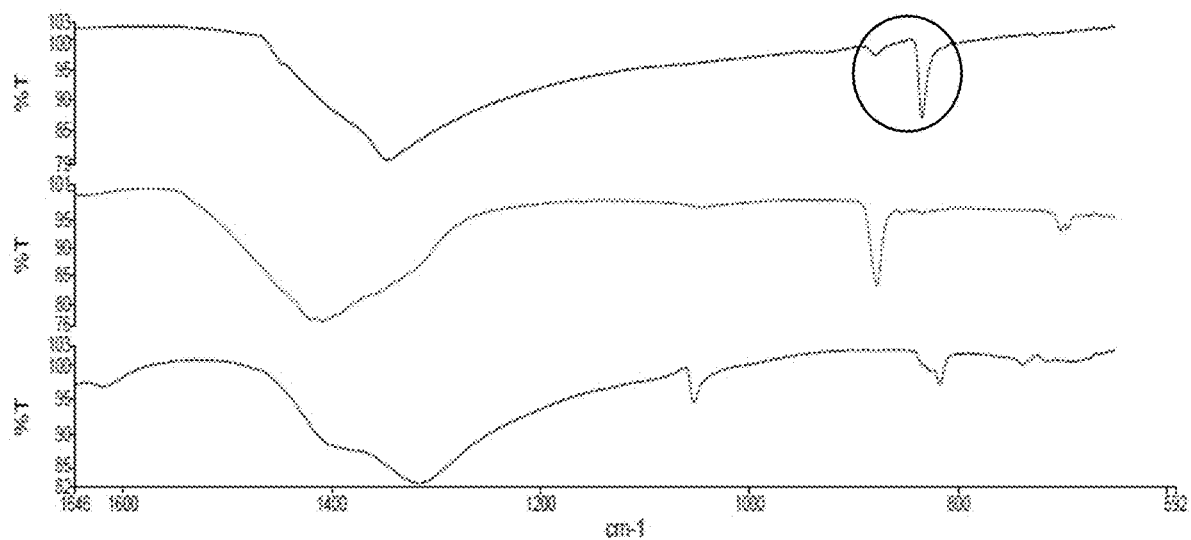
FIG. 4 is an ATR-FTIR spectra of synthesized $NaNiO_2$ powder, $Na_2CO_3$ grains, and $Ni(NO_3)_2$ crystals, with Ni—O vibrations indicated at 847 $cm^{-1}$.

Referring now to FIG. 4, the figure shows the attenuated total reflectance Fourier transform infrared (ATR-FTIR) spectra for synthesized $NaNiO_2$ powder as well as its $Na_2CO_3$ and $Ni(NO_3)_2$ precursors. The ATR-FTIR was used to validate the synthesis of the $NaNiO_2$ cathode material, as the Ni—O vibrations in the $NaNiO_2$ sample around 847 $cm^{-1}$ were consistent with those reported in De Silva et al., "Sodium nickel oxide nanoporous cathodes used for sodium-ion rechargeable batteries," vol. 15, pp. 19-29, 2014.

Figure 5:
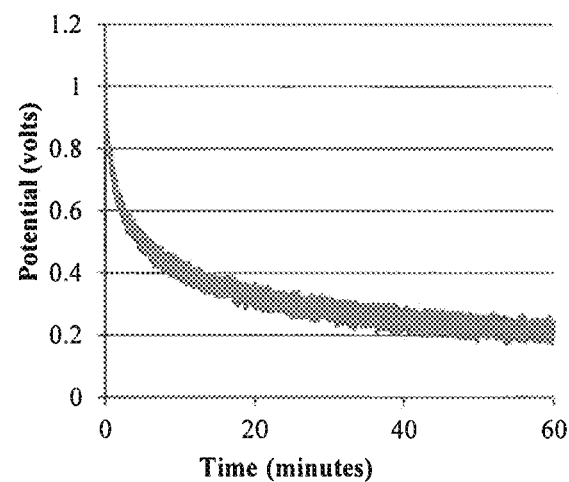
FIG. 5 is a discharge potential of MSE SIB after being charged at 2V for 3 h.

Referring now to FIG. 5, the figure shows the experimental results when the test cells were subsequently cycled utilizing a simple circuit that was constructed with an Arduino Mega microcontroller and a 25V, 5 A Entek DC transformer. The results indicated that MSE SIBs could operate at 1.1V at room temperature after being charged at 2V for 3 hours. This suggests a voltage efficiency of ~55%, though cell potential was almost entirely dependent on the electrode materials employed and their compatibility with the MSE.

A typical cycling regimen for an MSE SIB involved potentiostatic charging at 2-5V for 0.5-6 hour durations, after which the cells would discharge wither for a set amount of time (1-2 hours) or until they attained a minimum potential (0.1 V). MSE SIBs were put through 20-100 cycles at a time and ~200 cycles total.

Figure 6:
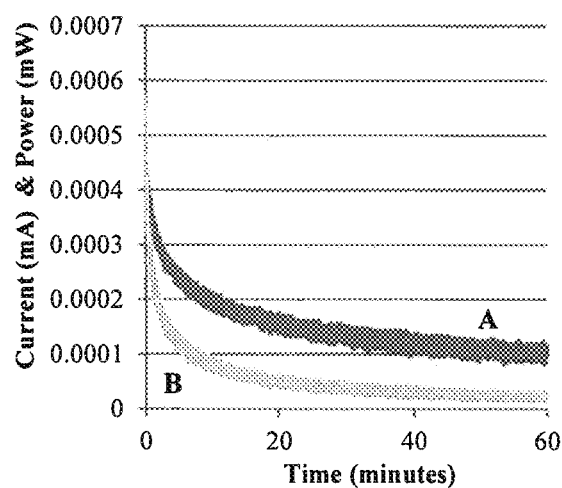
FIG. 6 is a discharge current (A) and power (B) of MSE SIB after being charged at 2V for 3 h.

Referring now to FIG. 6, the figure shows the discharge current (A) and power (b) of MSE SIB after being charged at 2V for 3 hours. This shows that the current fade during discharge and its subsequent effect on cell power can also be attributed to the capacity of the biochar anodes.

Figure 7:
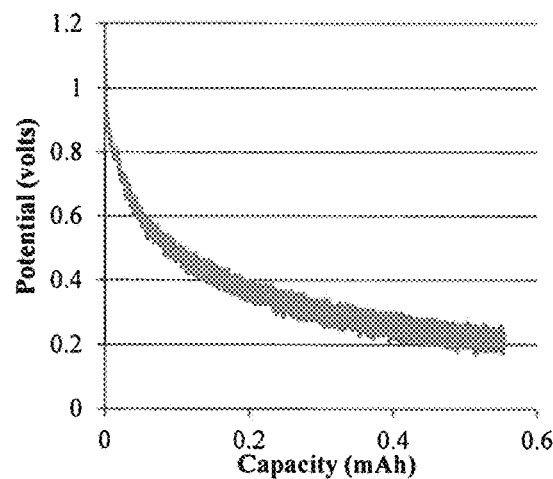
FIG. 7 is a potential and capacity discharge profile of MSE SIB after being charged for 3 h at 2V.

Referring now to FIG. 7, the figure shows the potential and capacity discharge profiles of MSE SIB after being charged for 3 hours at 2V. Maximum capacity was found to be 5.5 mAh after a 2V, 3 hour charge regimen. However, because only 13 mm-diameter MSE pellets and anodes were produced due to equipment limitations, only 42% of the internal available surface area within the 20 mm CR2032 cell casings was being employed.

Figure 8:
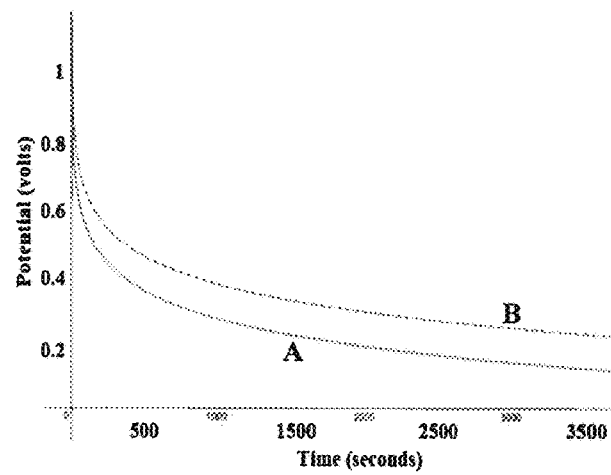
FIG. 8 is a logarithmic trendline function of MSE SIB discharge potential after being charged at 2V for 3 h (A) and translated trendline to simulate theoretical capacity with 20 mm-diameter cell components (B).

Referring now to FIG. 8, the figure shows a logarithmic trendline function of MSE SIB discharge potential after being charged at 2V for 3 hours (A) and a translated trendline to simulate theoretical capacity with 20 mm-diameter cell. These trendlines showed that the cells were theoretically capable of ~8.7 mAh with considerably less discharge current, voltage, and power fade.

Figure 9:
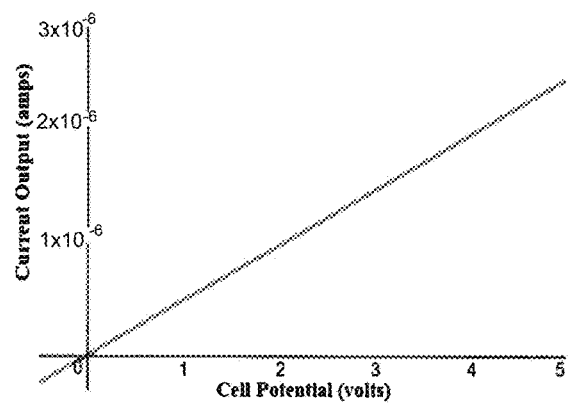
FIG. 9 is a mathematical model linking MSE SIB cell potential with theoretical current output via experimental MSE ionic conductivity data.

Referring now to FIG. 9, the figure shows a mathematical model linking MSE SIB cell potential with theoretical current output via experimental MSE ionic conductivity. The relationship between cell potential and current output was studied more closely within the context of the ionic conductivity of the MSE pellets. Ionic conductivity during cell discharge was found utilizing the following equation: $C=1/V*d/A$ where C is ionic conductivity in S/cm, I is current output in amps, V is voltage output, d is the distance between the electrodes—or the MSE pellet thickness in cm (0.15875 cm in this research), and A is the effective area of the cell electrodes in $cm^2$ (132.732 in this research). Between all discharge measurements of all cycles of all of the MSE SIBs, the effective ionic conductivity was always found to be $5.73 \times 10^{-8}$ S/cm. From this data was extrapolated the simple mathematical model: $I(V)=4.79097 \times 10^{-7}$ V in which I (current measured in amps) is represented as a function of V (cell potential). This model indicates that if MSE SIBs were constructed using more high performance electrodes capable of, for instance, a 3.8V cell potential as reported in literature, the MSE would facilitate a maximum current output of 0.0018 mA—three times as much as the 0.0006 mA shown in this research.

It is important to note, though, that $5.73 \times 10^{-8}$ S/cm was the effective ionic conductivity found. The value signifies the maximum conductivity achieved by the MSE when in combination with the electrode materials that were implemented, suggesting that the conductivity can be greater with higher-performance electrode materials. Representative of this assertion was the relatively poor performance exhibited by the control LE SIBs and the aggrandized performance that was later achieved with modification of the electrodes.

Figure 10:
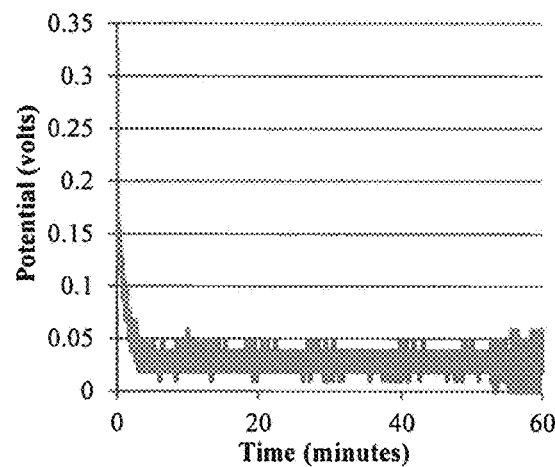
FIG. 10 is a discharge potential of LE SIB.

Referring now to FIG. 10, the figure shows the discharge potential of LE SIB. The LE SIBs produced a maximum voltage of 0.33 volts while using the same electrode materials as the MSE SIBs, demonstrating the shortcomings of the use of the simple and cost-effective standard electrodes with LEs.

Figure 11:
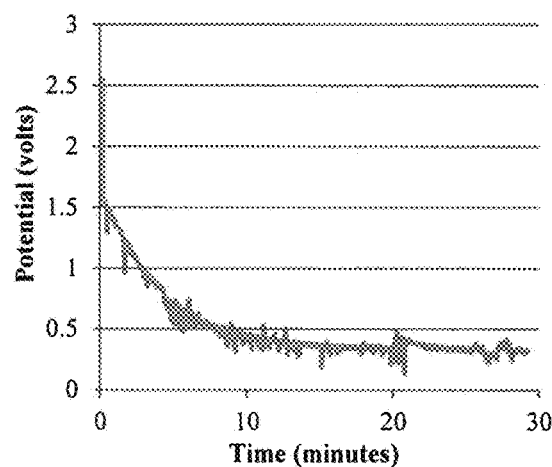
FIG. 11 is a discharge potential of LE SIB with an improved cathode.

Referring now to FIG. 11, the figure shows the discharge potential of LE SIB with an improved cathode. An experimental LE SIB cell was constructed with an $NaNiO_2$ cathode created from N-methyl-2-pyrrolidone-based slurry rather than a di-$H_2O$ one. The improved binder helped mitigate dissolution of the electrode into the LE, resulting in improved performance.

Even with improvements, none of the LE SIB cells were functional beyond two cycles, implying that the LE was not able to form efficient and reversible electrochemical complexes with the electrode materials. In contrast, MSE SIBs saw no loss of capacity even beyond 200 total cycles; furthermore, they showed great durability when it came to over-charging and over-discharging.

Figure 12:
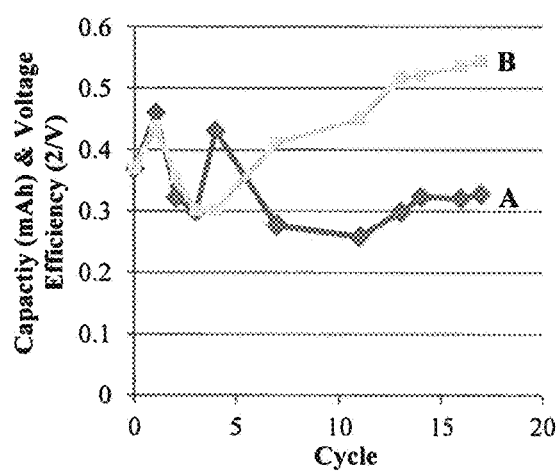
FIG. 12 is a MSE SIB capacity (A) and voltage efficiency (B) over 20 cycles with 2V, 2 h charge regimen and discharge duration of 1 h.

Referring now to FIG. 12, the figure shows the MSE SIB capacity (A) and voltage efficiency (B) where when cycled 20 times on a 2V, 2 h charge regimen with discharge duration limited to 1 h, MSE SIB output was characterized with relatively stable reversible capacity and voltage efficiency.

Figure 13:
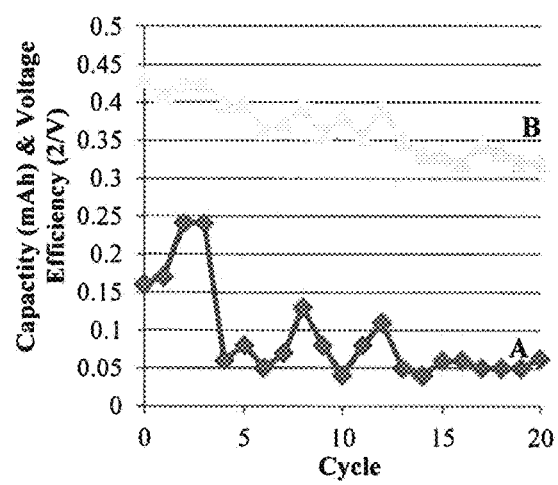
FIG. 13 is a MSE SIB capacity (A) and voltage efficiency (B) over 20 cycles with 2V, 2 h charge regimen and discharge potential limit of 0.1V.

Referring now to FIG. 13, the figure shows the MSE SIB capacity (A) and voltage efficiency (B) where the MSE SIBs cycled 20 times on a 2V and allowed to discharge to a minimum voltage of 0.1 V so that capacity would be reduced with each consecutive cycle. In this test, capacity remained fully reversible during and after the test and voltage efficiency, though also diminished in the test, was stable.

To develop a hypothesis regarding how this conduction mechanism might function, metakaolin's unique structure was investigated more thoroughly. X-ray diffraction (XRD) was utilized to explore the characteristics of the silica and alumina groups that make up the structure. The analysis was conducted with powder derived from pulverizing an SE pellet in an agate mortar.

Figure 14:
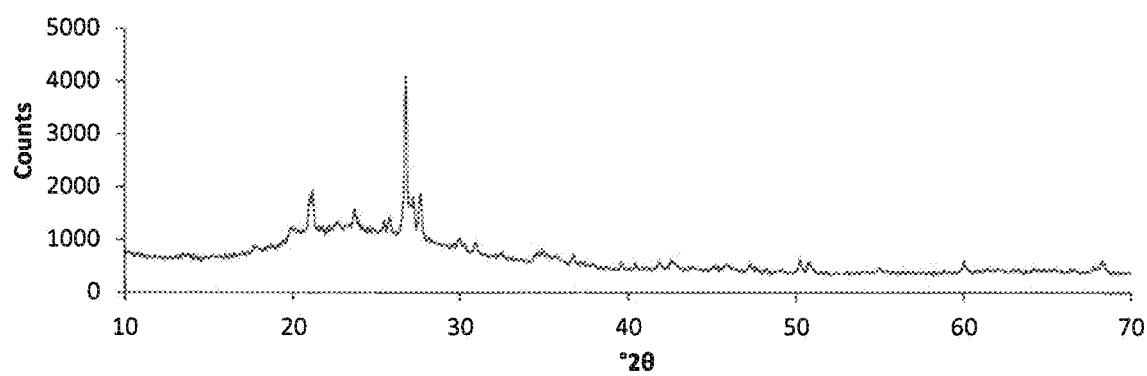
FIG. 14 is a XRD spectrum of a pulverized MSE pellet, in which there are visible distinct crystalline silica phases between -20° 2θ and 27° 2θ as well as amorphous alumina phases between 10° 2θ and 20° 2θ.

Referring now to FIG. 14, the figure shows the resultant spectrum indicated an array of unique and distinct silica crystal phases between ~20° 2θ and 27° 2θ as well as an amorphous nature to alumina structures between 10° 2θ and 20° 2θ. Alumina groups in the kaolinite were altered significantly when dehydroxylized during the calcination process; this subsequently led to the reformation of silica crystal phases to adapt to the structural changes, for a net result of a complex metakaolin structure characterized with a high degree of disorder.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed:

1. A sodium-ion battery comprising:
   a biochar-based anode layer;
   an $NaNiO_2$ cathode layer; and
   a metakaolin solid electrolyte pellets layer.

2. The sodium-ion battery of claim 1, wherein said biochar-based anode comprises biochar pelletized with a steel die.

3. The sodium-ion battery of claim 1, wherein said $NaNiO_2$ cathode comprises a mixture of polyvinylidene difluoride, carbon black, and sodium nickel dioxide combined with deionized water to form a slurry.

4. The sodium-ion battery of claim 3, wherein said $NaNiO_2$ cathode is formed by laying said slurry onto an aluminum plate and dried.

5. The sodium-ion battery of claim 1, wherein said metakaolin solid electrolyte pellets are derived from a calcination of kaolinite.

6. The sodium-ion battery of claim 1, wherein said biochar-based anode, said $NaNiO_2$ cathode, and said metakaolin solid electrolyte pellets are layered on an aluminum current collector; and
   wherein said biochar-based anode is layered first, then said metakaolin solid electrolyte pellets are layered, then said $NaNiO_2$ cathode is layered.

7. The sodium-ion battery of claim 6, wherein said aluminum current collector is placed on a first spacer plate and into a positive bottom of a coin cell, a second spacer plate is placed on said NaNiO2 cathode, a spring is placed on said second spacer plate, and a negative lid of said coin cell is placed on top of said spring to close said coin cell.

8. A power grid comprising:
   an energy storage source having a plurality of said sodium-ion battery of claim 1.

* * * * *